INVENTORS:

WILLIAM G. BEARDEN
CHARLES A. POWERS

BY Arthur McIlroy

ATTORNEY

United States Patent Office 3,729,337
Patented Apr. 24, 1973

---

3,729,337
PRODUCTION OF PETROLEUM FROM UNCONSOLIDATED FORMATIONS
William G. Bearden and Charles A. Powers, Tulsa, Okla., assignors to Amoco Production Company, Tulsa, Okla.
Continuation-in-part of application Ser. No. 674,551, Oct. 11, 1967, which is a division of application Ser. No. 571,508, Aug. 10, 1966, now Patent No. 3,366,177. This application Apr. 22, 1970, Ser. No. 31,028
Int. Cl. E21b 43/08
U.S. Cl. 117—98
5 Claims

ABSTRACT OF THE DISCLOSURE

A specially designed screen is described for use in wells producing oil from unconsolidated sands. The apparatus consists essentially of a sleeve fabricated from a ground hydraulic cement clinker, coated with a heat resistant film from material such as sodium silicate to impart compressive strength to the set clinker when the latter is exposed to oil. The clinker material which may be calcium silicate, calcium aluminate or high alumina cement may have a particle size ranging from −4 to +40 mesh.

---

This is a continuation-in-part of our copending application Ser. No. 674,551, filed Oct. 11, 1967, now abandoned, which was a division of our then copending application Ser. No. 571,508, filed Aug. 10, 1966, now U.S. Pat. 3,366,177.

The present invention relates to the production of fluids from loosely consolidated sands. More particularly, it is concerned with a novel improvement in the problem of controlling the flow of sand in hydrocarbon fluids produced either by means of conventional oil wells or by means of wells that are part of a thermal recovery method.

BACKGROUND OF THE INVENTION

Sand control in wells producing from unconsolidated formations is a major problem. This is true not only in conventional oil wells producing from unconsolidated zones, such as are found in the Gulf Coast area, but also the matter of sand control remains a serious problem in the recovery of oil from tar sands by thermal methods where high temperatures are encountered in addition to loosely cemented formations.

When a well penetrating an unconsolidated oil producing sand is placed on production, said erodes from the formation and deposits in the well. The presence of such sand in the well gives rise to a number of operating problems. In fact, they can be sufficiently serious to require abandonment of the well. In other instances this loose sand requires frequent workover jobs in order for the well to operate efficiently. In addition, removal of sand which accumulates in surface equipment such as flow lines, tanks, or separators adds substantially to the cost of production.

Sand filters such as slotted liners or screens have been proposed for the purpose of combatting this problem. Such equipment is usually inserted within the production tubing and placed opposite the producing formation. Packers are used as required to isolate the producing formation and then oil can flow directly from the formation through the liner or screen into the tubing. In spite of these liners or screens, however, said production still occurs and frequent workover jobs are necessary to maintain satisfactory production.

Gravel packing is still another technique that has been employed in an attempt to solve the sand production problem. In such cases a coarse sand (referred to as gravel) is packed around a wire-wrapped or slotted screen liner. This technique, however, fails to completely prevent sand production, and plugging of wells employing this procedure frequently occurs. Such packing appears to be defective, at least in part, for the reason that the gravel tends to shift or move even when packed in place. Movement of the gravel, in turn, causes the sand back of it to move, working its way through the gravel pack, abrading the liner, and allowing both gravel and sand to enter the well.

In the case of recovering oil from tar sands by means of combustion, we not only have the above-mentioned sand control problems but are, in addition, confronted with the difficulty of providing materials of construction capable of withstanding temperatures of the order of 1500° to 2000° F.

DESCRIPTION OF THE INVENTION

Briefly stated, our invention involves the discovery that the cement clinker in filter screens such as the type described in U.S. 3,244,229 when exposed to oil tends to undergo a substantial reduction in compressive strength, particularly after the screen has been exposed to elevated temperatures. This difficulty we have found can be overcome by coating the set or cured clinker mass with a material that is oil and water insoluble.

We have further observed that the treatment of cement clinker forms in accordance with our invention not only renders such forms stable on extended periods of exposure to oil but said treatment unexpectedly increases the compressive strength of these forms.

Figure 1:
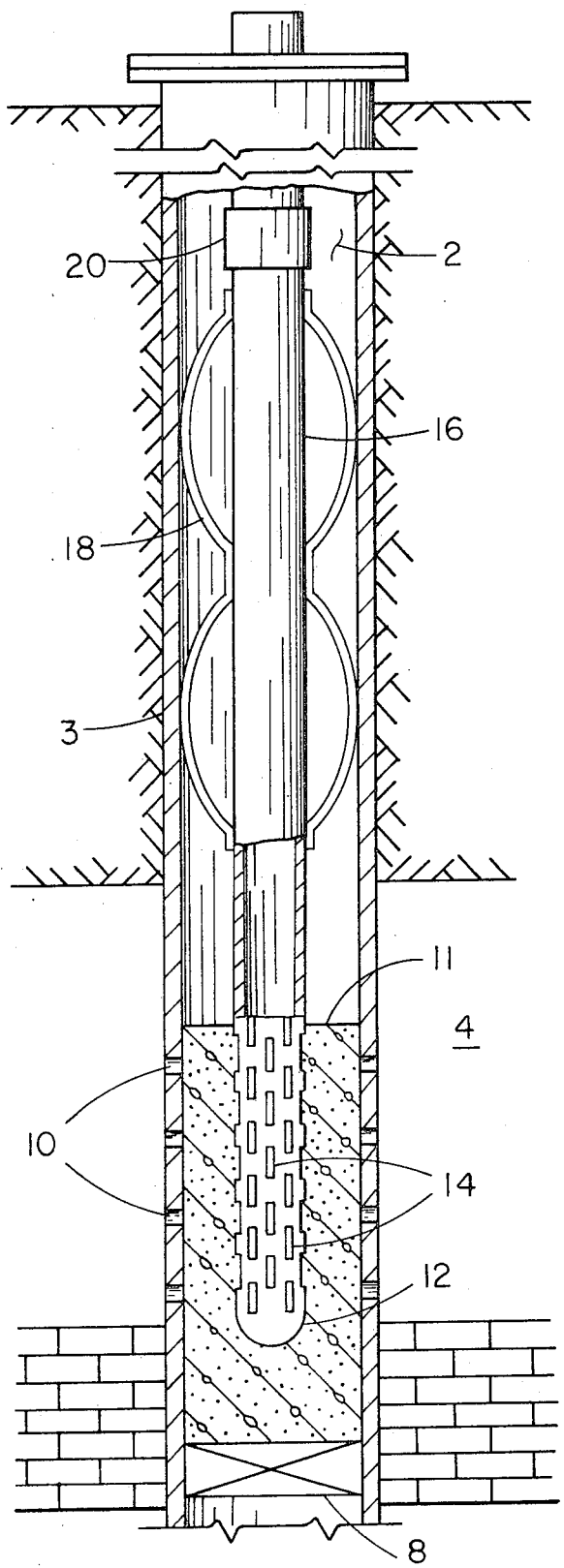
FIG. 1 shows a well 2 completed in a relatively thick section of unconsolidated oil producing sand 4 in which casing 3 is run into the pay and a plug 8 is set just below the portion of the zone to be produced. Next, perforations 10 are made in the casing over a distance of, for example, 10 to 20 feet, after which a sufficient quantity of a pumpable mixture of high alumina cement clinker is displaced down the well to form a column extending approximately from the lowermost of perforations 10 to about the upper portion of sand 4, or at least above the upper line of perforations. While cement is still soft, a drillable sub 12, e.g., made of a soft metal or plastic, having slots 14 is run in on tubing string 16. Alternatively, the cement may be added after sub 12 is in place. The plastic pipe 12 is held in proper alignment with the well by means of centralizers 18. Once cement pack 11 has set, the film forming material is placed down tubing 16 flowing out into the set cement. After a volume of said material corresponding to approximately the pore volume of pack 11 has been displaced therein, air is injected via tubing 16 in slots 14 to form the film on the surfaces of pack 11 in the manner previously described. When the well is placed on production, oil flows from sand 4 via perforations 10 through the permeable cement and into plastic sub 12. There is no movement of sand toward the well beyond perforations 10.

If, for any reason, it is desired to produce from a level below that shown in FIG. 1, tubing 16 may be separated from sub 12 by means of a back-off or tool joint 20, the tubing pulled and the cemented section, including plastic sub 12 and bridging plug 8, drilled out.

Figure 2:
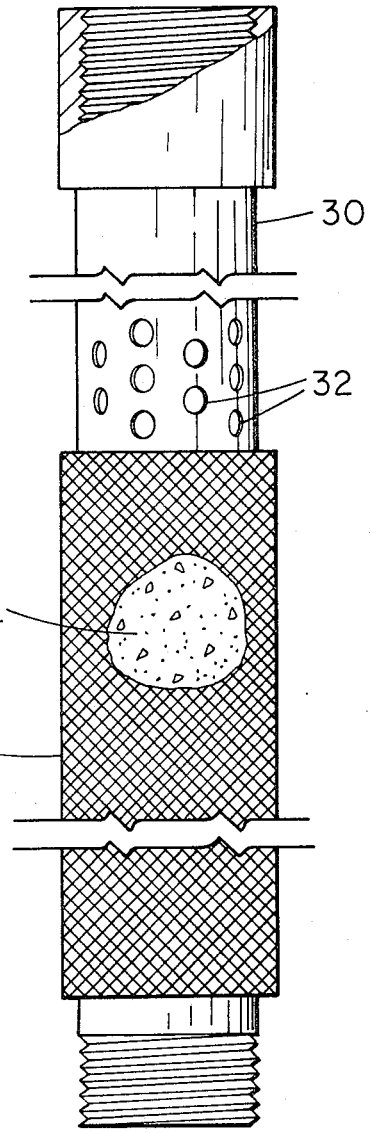

FIG. 2 is representative of one embodiment of a prefabricated liner employing our invention and comprises a section of tubing 30 perforated substantially throughout its entire length with drainage holes 32. Surrounding this perforated member is a layer of cement clinker 34 treated in accordance with our invention to impart resistance to the action of oil on the compressive strength of clinker 34. An expanded metal screen 36 is affixed over the entire surface of cement clinker 34 to protect it during installation. If desired, openings 32 may be in the form of slots. Also, between said openings and the layer of cement clinker there may be a layer of Keystone shaped wire, typically 304 stainless steel, wrapped around the tubing and secured thereto by means of welding, employing a spacing of .02 inch between strands of the wire. The threaded ends of the liner permit assembly of any number of sections, depending on the thickness of the unconsolidated formation involved.

Typically, a screen of this kind can be made from 4½ inch O.D. ¼ inch thick Incoloy 800 with 3/16 inch holes drilled on half-inch centers. The clinker cement may be put on in layers ranging from about ½ inch to about 1 inch in thickness. The expanded metal shell placed thereover may be from about 5½ inches to 6 inches in diameter.

The actual cement clinker filter element shown in FIG. 2 as 34 may be prepared by any of several procedures. For example, a suitable cylindrical form having an annulus, typically one to three inches in width, is placed in a vertical position and an aqueous slurry of the ground cement clinker poured into the annular space. Such a form is conveniently made of concentric rolls of thin sheet metal equal in length. The outer roll may be held in place by means of metal straps or the equivalent while the inner member is held in shape by means of metal clamps or internal cross bracing. When the cement has had time to set properly, the metal straps and bracing are removed and the inner and outer metal rolls separated from the newly formed liner. Thereafter the liner is treated with, for example, an aqueous solution of 41° Baumé sodium silicate solution in an amount corresponding to about 1 linear pore volume and then blown dry with air.

DESCRIPTION OF THE PREFERRED EMBODIMENT OF THE INVENTION

In carrying out an embodiment of our invention, we use a ground hydraulic cement clinker prepared from calcium silicate, high alumina cement, or calcium aluminate. The ground material may be placed in position in essentially the same manner as a gravel pack, i.e., introduced in dry form. However, the pack resulting from the use of cement clinker differs markedly from that made of gravel since the particles of clinker in the presence of water, which is ordinarily standing in the well, hydrate and bond to one another at points of contact. After the cement clinker has set, it is treated with a material capable of leaving or forming a high temperature (e.g., 1500° to 2000° F.) resistant film on the surface of the cement particles. Typical examples of such materials are potassium and sodium silicates, saueresin—a liquid porcelain—and the like. In this connection, in the present description and claims, such substances will generally be referred to as a "heat resistant film forming material." This material is displaced down the well either in the form of a solution or as a slurry to contact the set cement clinker. Thereafter a hardened film is formed on the cement by subjecting the resulting mass to a drying operation by the use of an inert gas such as air. The gas employed may be either substantially at formation temperature or, if desired, can be heated to higher temperatures if a shorter treating period is felt necessary. In this way a strong, rigid filter is formed which does not lose its compressive strength on exposure to oil over long periods of time. This filter is capable of preventing sand from entering the well while at the same time allowing fluids to be produced in a normal manner. The increased strength of the resulting filter pack is beneficial for the reason that it lends support to the incompetent formation and thereby prevents movement of the sand grains therein.

As a source of suitable ground material we have found high alumina cement clinker to be particularly effective. The clinker may be converted for use in our invention in a number of different ways. For example, it can be passed through a coarse grinder, then screened to provide the desired particle size distribution. In this regard, tests have shown that high alumina cement (Lumnite—a calcium aluminate cement) clinker ground to a particle size ranging from about −4 to about +40 mesh, when allowed to set properly, can have a tensile strength in excess of 200 p.s.i., a compressive strength of 1500 p.s.i., and a permeability as high as 60 darcys.

Generally speaking, and particularly for thick producing sections, we prefer to prepare the filter screens of our invention from Lumnite cement clinker or its equivalent having a particle size range of from about −4 to about +12 mesh. Such screens function more satisfactorily and retain more of their original permeability after installation than do screens made from particles of a smaller size range. For example, in using screens made with the smaller particle size range, i.e., −10 to +20 mesh, in wells with a thick, e.g., 200 feet, producing section such as found in the tar sand deposits, these screens lose approximately 75% of their initial permeability as a result of the installation procedure. However, for wells having a relatively thin producing section, e.g., 20 feet, screens made from the −10 to +20 mesh particles operate satisfactorily because the installation procedure is less severe and requires substantially less fluids in the "washing in" step than are necessary where the screen is longer and the producing zone is thicker.

In installing these liners, they may be run into the well on tubing and placed opposite the incompetent oil producing zone. Methods for running screens of this kind into a well have been practiced for many years. Typical of such procedures are those described in expired U.S. Pats. Nos. 2,154,461 and 2,167,190 as well as 2,205,422.

The advantages afforded by our invention are further illustrated in columns 2 and 3 of Table I below which reports the results of a series of tests made to establish strength and permeability characteristics of Lumnite cement clinker, for example, −12 to +20 mesh, for use in connection with the manufacture of well liner sand screens. The clinker was tested in the form of 2-inch cubes and placed in water usually for 48 hours to cure at room temperature, i.e., about 75° F. After setting, these cubes were then treated under the various conditions referred to below. The principal objectives of these tests were to determine the effect of oil on the strength and permeability of the clinker screen after firing, i.e., heating in an oven to about 800° F. for 48 to 72 hours. The results are shown in column 2 and demonstrate that the strength of the clinker is reduced substantially on contact with oil after the heating step.

Comparative compressive strength data obtained on the clinker sample cured first in water and then soaked in oil before firing showed that the oil causes a strength reduction of about 43%. After firing, the compressive strength of the clinker first cured in water and then soaked in oil was reduced by approximately 68% compared to that of the initially cured material. The strength reduction is reflected in the higher permeabilities obtained after firing.

In another series of tests, shown in column 3 of the table, two inch cubes of the cement clinker after being cured in water for 48 hours at room temperature were saturated with 41° Baumé sodium silicate solution. The saturation step was effected by flowing 1 cube pore volume of the sodium silicate solution through the clinker and thereafter blowing this material dry with air (100° F.). Next, the permeability and compressive strength of the treated clinker were measured after which it was exposed to oil, and permeability and compressive strength observed. The specimens were then heated at 800° F. for a period of 48 hours and exposed to oil, following which permeability and compressive strength measurements were again taken.

These data indicate that appreciable permeability reduction can be expected by treatment with a relative concentrated sodium silicate solution but that greater strength is imparted to the clinker by such treatment.

TABLE I

| | Plain clinker | Clinker treated with silicate |
|---|---|---|
| After initial curing: | | |
|   Permeability to water, darcys | 50 | 28 |
|   Compressive strength, p.s.i. | 1,200 | 1,780 |
| After exposure to oil—before firing: | | |
|   Permeability to oil, darcys | 56 | 28 |
|   Compressive strength, p.s.i. | 785 | 1,290 |
| After firing at 800° F. and exposure to oil: | | |
|   Permeability to oil, darcys | 71 | 20 |
|   Compressive strength, p.s.i. | 390 | 1,155 |

An effort was made to determine whether or not the water curing step could be avoided by attempting to cure the cement clinker in solutions of sodium silicate. However, when the samples were dried and heated to temperatures of 300° F. in some cases and 800° F. in others, it was found that the cubes disintegrated.

To demonstrate the ability of these alkali metal silicates to unexpectedly increase the compressive strength of high alumina cement form still another series of tests were carried out. In these tests, 2-inch cubes of −4 to +12 mesh of Lumnite cement clinker were used and prior to treatment with the various materials indicated below were cured in water at room (75° F.) temperature for 96 hours and then air dried at room (75° F.) temperature for 48 hours. Thereafter, some of these cubes were saturated with clear furniture lacquer, some with clear spar varnish, some with 37% sodium silicate solution, some with a 10% sodium silicate solution and some were untreated. In the treating process the cubes were saturated with the film-forming material, then immediately blown dry with air. Thereafter, they were placed in water for 120 hours and then dried for 168 hours. The results obtained are shown below in Table II.

TABLE II

| | Compressive strength, p.s.i. |
|---|---|
| Plain clinker | 1066 |
| Clinker treated with— | |
|   Clear lacquer | 766 |
|   Clear varnish | 756 |
|   37% sodium silicate sol | 1226 |
|   10% sodium silicate sol. | 1262 |

From the above data it is evident that the compressive strength of the clinker cement is not improved merely by coating it with any film forming material but that such strength can be substantially increased by the use of an alkali metal silicate solution in accordance with our invention.

As a result of the work described above, acceptable permeabilities and high compressive strengths unaffected by oil can be secured by treating the clinker material with a suitable liquid porcelain or alkali metal silicate before said material is subjected to high temperature.

We claim:

1. A new article of manufacture resistant to substantial reduction in compressive strength on exposure to oil, comprising a hollow, cylindrical, oil permeable sleeve fabricated from a ground hydraulic cement clinker selected from the group consisting of calcium silicate, calcium aluminate, and high alumina cement, said clinker having a particle size ranging from about −4 to about +40 mesh, wherein the interior surfaces of the pores in said sleeve have been coated with a heat resistant material selected from the group consisting of an alkali metal silicate and a liquid porcelain.

2. The article of manufacture of claim 1 in which the film forming material is sodium silicate and the cement clinker employed has an average particle size ranging from about −10 to about +30 mesh.

3. The article of manufacture of claim 1 in which said material is sodium silicate and the cement clinker employed has an average particle size ranging from about −4 to about +12 mesh.

4. The article of manufacture of claim 1 in which the cement clinker has an average particle size ranging from about −4 to about +12 mesh.

5. The article of manufacture of claim 1 wherein the amount of said material employed corresponds to about 1 pore volume of said permeable sleeve.

References Cited

UNITED STATES PATENTS

| 2,019,852 | 11/1935 | Harrap | 117—126 UX |
| 2,195,587 | 4/1940 | Snell | 117—123 X |
| 2,372,285 | 3/1945 | Marc et al. | 117—123 X |

OTHER REFERENCES

Rose, The Condensed Chemical Dictionary, 1961, p. 1053.

ALFRED L. LEAVITT, Primary Examiner

U.S. Cl. X.R.

55—524; 117—123 B, 169 A; 166—228; 210—510